April 25, 1961 P. J. BREWINGTON 2,981,072
DRAIN PIPE JOINT
Filed Feb. 21, 1957
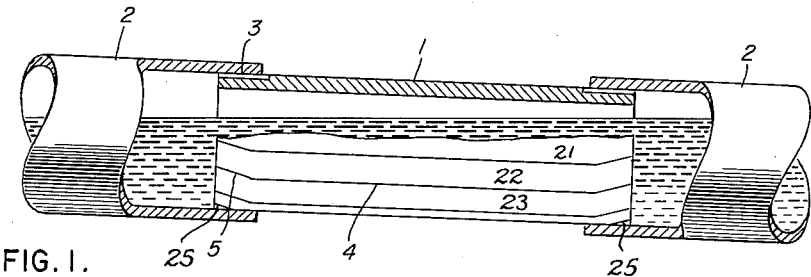
FIG. 1.
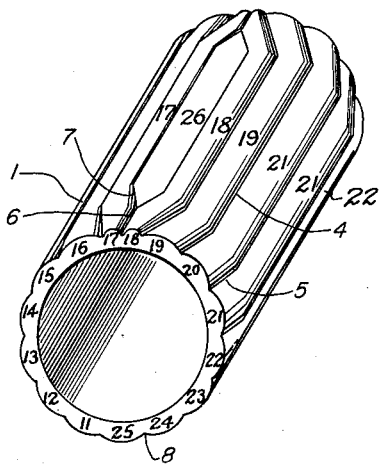
FIG. 2.
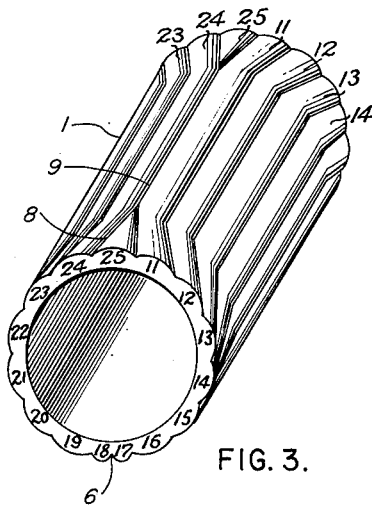
FIG. 3.
FIG. 4.
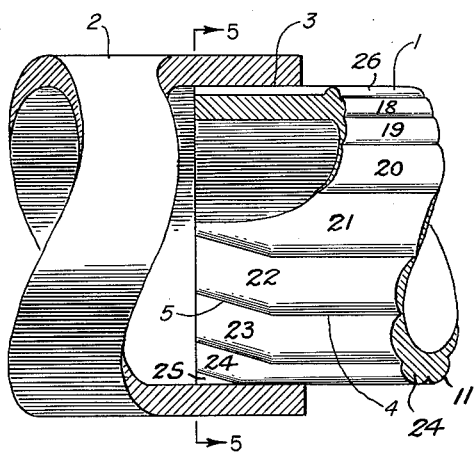
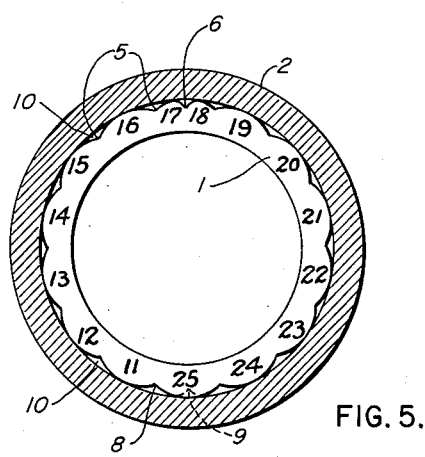
FIG. 5.
INVENTOR.
PHILIP J. BREWINGTON.
BY Henry H. Snelling

United States Patent Office 2,981,072
Patented Apr. 25, 1961

2,981,072
DRAIN PIPE JOINT
Philip J. Brewington, 4204 Alice Ave., Austin 5, Tex.
Filed Feb. 21, 1957, Ser. No. 641,528
3 Claims. (Cl. 61—11)

This invention relates to drain pipes or tiles and has for its principal object the provision of a piping system in which each alternate pipe partially telescopes into an adjacent pipe on each side, fitting with any chosen degree of snugness to provide the desired amount of leakage and requiring no joint covering, the system forming a reservoir to impound a portion of drain water which is to be discharged through the leakage passageways which are grooves at the telescoped ends of the smaller diameter sections.

A further object of the invention is to provide drain piping which can more readily be shipped, as the sections may be all of the same length so that each smaller section can be completely telescoped into a larger section when being transported, and when assembled will minimize entry of dirt into the system as the water leaking from the system carries any dirt in a downward direction against the tendency of the dirt to enter the system.

A still further object of the invention is to provide a drain pipe for use with a septic system or an underground irrigation system in which the drain pipe is a reservoir to impound the water and distribute it equally throughout the entire length of the irrigation line, without the need to provide an absolutely uniform bottom in the drainage ditch.

While the larger tiles or pipes may be of any configuration, they are preferably smoothly cylindrical both inside and outside, but the smaller pipe sections are ribbed so as to provide grooves or valleys between adjacent ribs and the two ends of these valleys, instead of being parallel to the axis of the pipe sections, are displaced at each end from the top to the bottom so that while water can readily flow slowly from the system, dirt may not readily enter the pipe as at all points in the grooved passageways the dirt must travel upwardly to enter. By the configuration illustrated all large opening joints are eliminated and it is consequently unnecessary to cover the joint between the two sections with a fiber covering as is usual with other systems.

In the drawings:
Figure 1 shows a section of the pipe system.
Figure 2 is a perspective view of an inner tile or pipe.
Figure 3 is a similar perspective view but showing the pipe or tile bottom side up.
Figure 4 is an enlarged view partly in section showing an end of a smaller pipe inserted in an end of a larger pipe.
Figure 5 is a view taken on line 5—5 of Figure 4.

The drain pipe of the present invention can be used in a great many situations and for different purposes. When used as a drain pipe the sections may merely be laid in an open trench as the configuration of the smaller sections minimizes entry of dirt into the system and consequently no earth covering is required. The same applies equally well when the pipes are used within a subirrigation system where the piping may be entirely buried. The smaller section of tile or pipe, the terms being interchangeable, is denoted by the numeral 1. The larger section 2 preferably is of the same length as the smaller section 1 but this is purely optional and the principal advantage of having both sections exactly the same length is that this facilitates greatly the shipment of tile for a system, as each smaller pipe fits snugly within a section of the larger pipe.

In normal field use the smaller section 1 is inserted to a chosen amount in the larger pipe, as at 3. The smaller section is ribbed or corrugated preferably for its full length as shown, the ribs being smoothly curved as shown. The short valley 6 between the two rib ends at the extreme top of the tile 1 is perfectly level; that is, it is parallel to the axis of the pipes 1 and 2, this valley 6 forming a fork 7 diverging toward the midportion of the tile. The two arms of fork 7 may be either straight or curved but the stem 6 of the fork should be straight.

The constant sloping of the several valleys at both ends of the tile forms two short merging valleys 8 near the bottom of the tile at each end merging with the central and level valley 9 between two adjacent bottom ribs. It will be noted from Figure 5 that when the pipes or tiles are assembled as illustrated there will be a small passageway 10 or groove triangular in cross-section corresponding to each valley to allow for escape of the water or other liquid in the system.

For conveniece of description, the corrugations of the telescoped pipe are numbered from 11 to 26. It will be noted that each of these curved corrugations or ribs is about of equal size except that ribs 17 and 18, while together exactly $\frac{1}{15}$ of the circumference at the tile end, diverge from there toward the midportion of the tile and also increase in width until each of these ribs is twice as wide and therefore subtends an angle of 24° the same as in the middle of the tile. The gradual sloping of the various ribs at each end forms a short triangular end corrugation or rib 25 at each end of the pipe, these ribs being at the very bottom of the pipe when the system is assembled. The short rib 25, therefore, has a level valley 9 between ribs 11 and 24 at its apex and has two diverging fork arms forming valleys 8 extending from the apex of the triangle to the end of the pipe. The arms or valleys 8, like the arms 7, may be straight or gently curved.

As best seen in Figure 5, it will be noted that water seeping through a passageway 10 bounded by the inside surface of pipe 2 between corrugations 11 and 12 at the end of tile 1 will leave the tile 1 at a lower level, that is, between the corrugations 11 and 12 at the midportion, and water following either of the two valleys 8 close to the bottom of the tile will discharge downward through valley 9 shown in this figure in dotted lines. The same figure will show that the valley 6 at the top between reduced sized rib ends 17 and 18 is perfectly level when the pipe section itself is level but the arms of the fork 7 slope downwardly toward the midsection of the tile 1. If the system should be full of water, water discharging between the level valley 6 and the outer pipe 2 would discharge along the fork 7 and would discharge in the slanted valley 5 beyond the end of the outer section of the pipe 2 in which pipe or tile 1 is telescoped.

At the midportion of tile 1 each of the uneven number of ribs, here illustrated as fifteen, all exactly of the same width, subtends an equal number of degrees, for example 24°, from the axis of the piping. I prefer that the triangular ribs 25 at the bottom of the tile and the diametrically opposite top pair of ribs 17 and 18 shall also subtend the same angle; hence, all other ribs at the tile end must subtend a slightly larger angle, 26°, in order that there shall be fifteen ribs at each end, corresponding to the number of ribs in the midportion. The top rib 26 terminates at each fork 7 quite well short of each tile end. Except for bottom ribs 25 and top rib 26, all of the ribs have a central straight portion with two angularly disposed ends extending in the same direction so the valleys at the ends make an obtuse angle upwardly with the straight central valley or groove.

This configuration of the ribs at both ends effectively minimizes entry of dirt into the system when the pipes are telescoped as in Figure 1. The short valley 6 between ribs 17 and 18 at the end of tile 1 is the highest point of the leakage system and consequently dirt trying to enter the system through this valley must first pass upwardly from the valleys 7. It is still more difficult for dirt to enter elsewhere on the top half of tile 1 as each successive curved valley 17—16, 16—15, 15—14, also 18—19, 19—20 and 20—21, is successively more uphill from the free end of pipe 2 to the telescoped end of pipe 1. In some of the claims the inner pipe 1 is called a tile and the outer pipe 2 is called a pipe, but this is solely for clarity as the terms are interchangeable.

What I claim is:

1. A drain tile having a central cylindrical passageway and at each end an uneven number of outer surface rounded ribs forming valleys at their side junctions, each of the ribs except a pair of adjacent ribs at the top subtending an equal angle from the longitudinal axis of the tile, the ribs of said pair being of half the size of the other ribs and therefore together subtending the said angle, the valley between said pair being parallel to the longitudinal axis of the tile, the bottom rib opposite said parallel valley being generally triangular with its vertex toward the midportion of the tile, each of the other valleys being paired with the valleys of each pair on opposite sides of the drain pipe and equally distant from said parallel valley, one valley of each pair diverging from the other valley of that pair so as to be roughly parallel to the bottom valleys at the two sides of the triangular rib, whereby when either tile end is telescoped in a larger cooperating pipe with said parallel valley uppermost and the tile longitudinal axis is horizontal, all other valleys in the tile will be downwardly disposed from the tile end toward the midsection of the tile to discharge water at an angle and therefore sloping upwardly from the tile midsection toward the tile ends to minimize entry of dirt into the tile when partially telescoped into a cylindrical pipe fitting the crowns of the rounded ribs.

2. A drain tile having a central cylindrical opening and an outside generally cylindrical surface provided with an odd number of rounded ribs at the mid-portion of the tile generally parallel to the longitudinal axis of the tile, said ribs at their side junction forming parallel valleys or grooves the bottoms of which are at equal distances from the axis of the opening, the tile having at each end the same odd number of ribs, two of which ribs are smaller, being substantially half the size of the other ribs and therefore together subtend approximately the same number of degrees as any one of the remaining ribs, the smaller ribs diverging toward the midportion of the tile to form between them a central top rib of the same distance between valleys as the proximate ribs, said tile at each end at the bottom and diametrically opposite the two smaller ribs having a generally triangular rib with its apex in the valley between adjacent ribs, all of the ribs except said central top rib therefore having displaced ends whereby the valleys proximate the two smaller ribs at the top will converge as they approach the drain tile end, all but one of the valleys proximate the tile end sloping downwardly from the tile end when the tile is horizontal with the two smaller ribs uppermost.

3. A drainage system including a plurality of telescoping cylindrical, larger and smaller tiles, each larger tile being an integral piece of the same length as the alternate smaller diameter tile, each larger tile having a smooth cylindrical interior surface fairly snugly receiving telescopically at each end, a portion of each of the proximate smaller tiles, so that the major portions of the larger tiles form reservoirs of water to be leaked out of the system, each smaller tile having equally spaced grooves proximate its telescoped portion and parallel to the longitudinal axis of the tile, each of the groove ends changing direction as they approach the telescoped end of the tile, two of said grooves meeting near the tile end and merging to form a single groove at the top of the tile at each end, parallel to the longitudinal axis of the tile and a groove forking to form two grooves diverging toward each of the two ends of the tile at the bottom of the tile so as to become generally parallel to the two nearest groove ends, whereby water leaving the system will drive dirt, tending to enter the system, in a downward direction out of the system.

References Cited in the file of this patent

UNITED STATES PATENTS

| 2,422,582 | Milliken | June 17, 1947 |
| 2,649,105 | Stout et al. | Aug. 18, 1953 |

FOREIGN PATENTS

| 477,922 | Germany | 1929 |
| 505,608 | Great Britain | 1939 |